United States Patent [19]

Baer

[11] Patent Number: 4,476,854

[45] Date of Patent: Oct. 16, 1984

[54] GAS SPRING SOLAR TRACKER

[75] Inventor: Stephen C. Baer, Albuquerque, N. Mex.

[73] Assignee: Zomeworks Corporation, Albuquerque, N. Mex.

[21] Appl. No.: 551,240

[22] Filed: Nov. 14, 1983

[51] Int. Cl.³ ............................ F24J 3/02; F03C 5/00
[52] U.S. Cl. ....................................... 126/425; 60/531
[58] Field of Search ...................... 126/424, 425, 419; 353/3; 250/203 R; 60/430, 431, 530, 531; 49/2, 31

[56] References Cited

U.S. PATENT DOCUMENTS

| | | | |
|---|---|---|---|
| 1,911,426 | 5/1933 | Brodie | 126/425 |
| 3,884,414 | 5/1975 | Baer | 126/425 |
| 4,079,249 | 3/1978 | Glynn | 126/424 |
| 4,175,391 | 11/1979 | Baer | 126/424 |
| 4,275,712 | 6/1981 | Baer | 126/425 |
| 4,349,011 | 9/1982 | Hartsog | 126/419 |

Primary Examiner—Samuel Scott
Assistant Examiner—G. Anderson
Attorney, Agent, or Firm—Townsend and Townsend

[57] ABSTRACT

The present invention provides apparatus for tracking the sun which reorients itself immediately in the absence of sunlight. Large and small cannisters are provided at the respective ends of a pivotable frame. When the sun is not normal to the plane containing the cannister, the near cannister is shaded from direct sunlight and the far cannister is exposed. A conduit is provided between the cannisters, and a quantity of volatile fluid is located in the cannisters and conduit. The liquid volume of the volatile fluid is greater than that of the small cannister plus the conduit, but less than the volume of the large cannister. A gas spring fluid is located in the large cannister, which has a vapor pressure sufficient to force the volatile fluid into the small cannister in the absence of sunlight on the east cannister.

21 Claims, 10 Drawing Figures

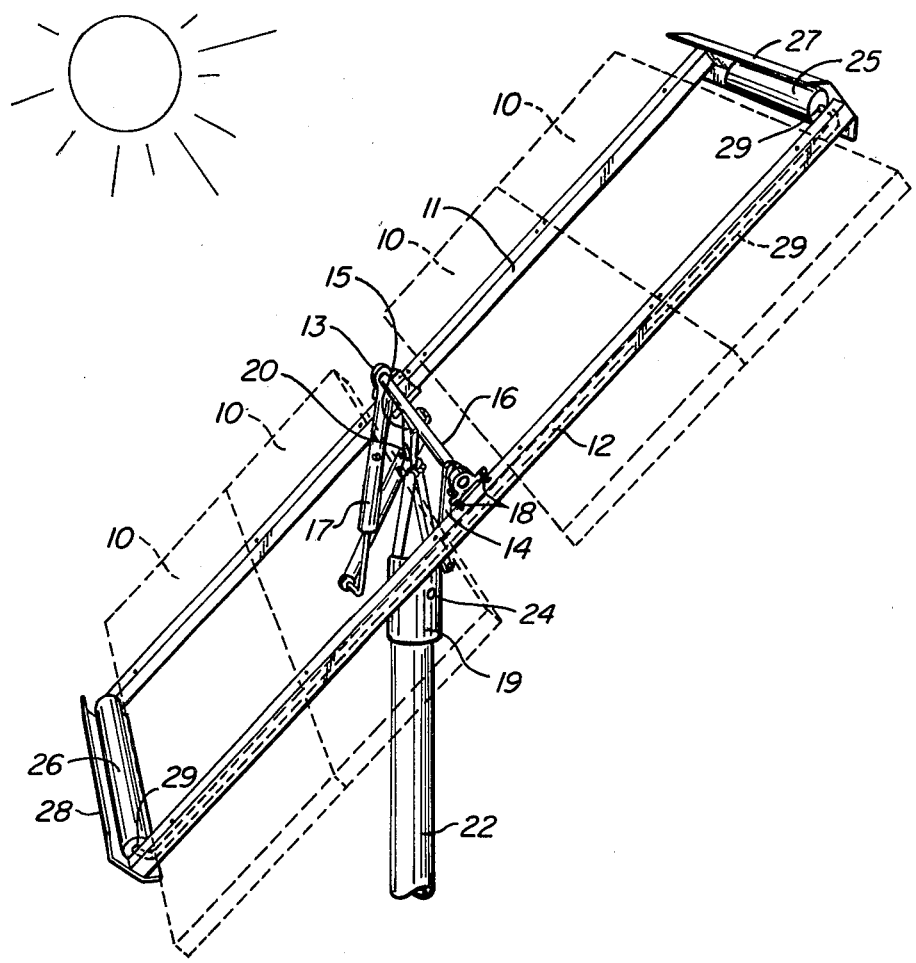
FIG._1.

GAS SPRING SOLAR TRACKER

This application relates to a solar tracker, and in particular a solar tracker utilizing a gas spring to reorient the tracker when sunlight is not available.

BACKGROUND OF THE INVENTION

The basic concepts of a solar tracker are illustrated in U.S. Pat. No. 2,999,943 to Geer. Such trackers employ a pivotal frame, having cannisters at each end which are interconnected at the low ends of the cannisters. Shadow bars overlie the outer half of each cannister to shade the near cannister from direct sunlight when the sun is not directly above the collector surface. A volatile fluid and its vapor is contained with the cannisters, and as the sun moves from east to west, the east cannister is heated to force the volatile fluid into the west cannister, tilting the frame westward to follow the sun. The frame is balanced when equal sunlight falls on each cannister, so the frame points directly at the sun.

The principal advantage of the solar tracker described above are its ability to track the sun in a totally passive fashion. However, considerable difficulty has been encountered in reorienting the frame in the absence of sunlight, usually so that the collector is repositioned for the morning sunrise. U.S. Pat. No. 4,275,712 to Baer refers to a prior application disclosing a system in which the cannisters are painted different colors or otherwise provided with differential insulation. This causes the fluid to be forced from the west cannister to the east cannister at the end of the day because of differential heat loss to reorient the tracker. However, under certain atmospheric conditions, the desired differential heat loss will not be achieved, and the tracker will not reorient itself as desired. A different system is disclosed in U.S. Pat. No. 4,275,712, in which a separate plate is used on the pivotal axis of the tracker to reorient it in the morning. This design adds needless complexity to the system and defeats its basic simplicity. The use of mirrors underlying the east cannister to catch the early morning sun has also been suggested, but this technique is often defeated by early morning cloud cover, a common occurrence in certain locations. These latter two designs are acceptable in many applications, but certain situations require reorientation immediately upon loss of sunlight and such systems are unacceptable.

SUMMARY OF THE INVENTION

The present invention provides apparatus for tracking the sun which reorients itself immediately in the absence of sunlight. Large and small cannisters are provided at the respective ends of a pivotable frame. When the sun is not normal to the plane containing the cannisters, the near cannister is shaded from direct sunlight and the far cannister is exposed. A conduit is provided between the cannisters, and a quantity of volatile fluid is located in the cannisters and conduit. The liquid volume of the volatile fluid is greater than that of the small cannister plus the conduit, but less than the volume of the large cannister. A gas spring fluid is located in the large cannister, which has a vapor pressure sufficient to force the volatile fluid into the small cannister in the absence of sunlight on the east cannister.

With the apparatus of the present invention, sufficient solar input to the small cannister, such as when the frame encounters a rotational stop in late afternoon, forces all of the liquid volatile fluid from the small cannister to purge it of foreign gasses. This purging action is enhanced in the preferred embodiment by the use of a small reservoir at the high end of the cannister. The gas spring provides a biasing force which pushes the volatile fluid from the large cannister toward the small cannister. At night time, therefore, when the temperatures of the cannisters are the same, or when the sun is behind a cloud or otherwise blocked, the gas spring will force the fluid into the small cannister so that the small cannister is filled and the frame will tilt toward the small cannister.

The apparatus of the present invention provides a mechanism for reorienting the tracker which does not add complexity to the basic system. Moreover, the apparatus is completely passive, and will not be defeated by quirks of nature such as warm nights, cloudy mornings and the like. When used as a conventional solar tracker to follow the sun during the day, the tracker will reorient itself to the east at nightfall. In other situations, such as sun-blocking louvers or a batch water heater, the device orients itself to its original position in the absence of sunlight, including not only nightfall but other circumstances such as cloud cover.

The novel features which are characteristic of the invention, as to organization and method of operation, together with further objects and advantages thereof will be better understood from the following description considered in connection with the accompanying drawings in which preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWING

FIG. 1 is a perspective view of a solar panel frame incorporating the apparatus of the present invention;

DESCRIPTION OF THE PREFERRED EMBODIMENTS

Figure 2A:
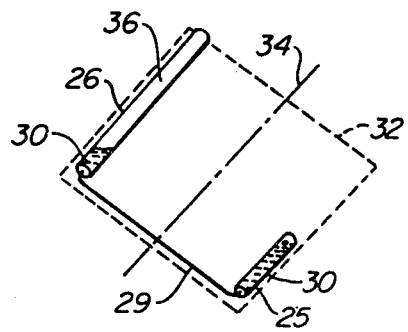
FIGS. 2A-E are a series of schematic views illustrating the operation of the apparatus of the present invention.
Figure 2B:
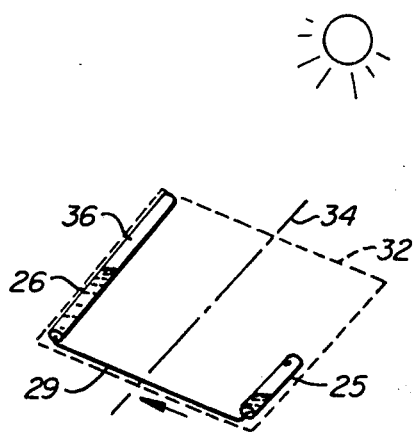

In FIG. 1, a preferred embodiment of the present invention is illustrated for supporting a plurality of solar panels 10 and orienting the solar panels toward the sun. Solar panels 10 are mounted on a pair of frame members 11, 12. Frame members 11, 12 have bearings 13, 14 respectively which are rotatably attached to a rod 16 so that frame members 11, 12 are rotatable with respect to the rod. Shock absorber 17 dampens rotation of the frame, minimizing perturbations due to wind gusts and the like. Stops 18 are provided so that rotation of frame members 11, 12 relative to the rod is limited to ±55° from a vertical plane.

Rod 16 is supported by a bracket 15 attached to a downwardly opening cup 19 by bolt and nut 20. Cup 19 rests upon the top of a pipe 22 solidly fixed in the ground, and the position of cup 19 relative to post 22 is fixed by set screw 24. Cup 19 on top of post 22 is rotated until rod 16 faces north and south, at which point set screw 24 is tightened. Frame members 11, 12 are thus constrained to rotate about a north/south axis, and are limited to an arc of ±55° east and west. Bolt and nut 20 are adjusted so that the entire frame points at the path of the sun. As the azimuth of the path of the sun changes throughout the year, bracket 15 is adjusted accordingly to maximize solar input on solar panels 10.

Tracking of the sun as it moves from east to west is accomplished through the use of cannisters 25, 26 located on the east and west ends of frame members 11, 12 respectively. In the apparatus of the present invention, east cannister 25 has a significantly smaller volume than west cannister 26, preferably about one-half. The low ends of cannisters 25, 26, typically the ends nearest the equator of the Earth, are connected by a conduit 29. Shadow bars 27, 28 extend over the respective cannisters 25, 26 from a position outside of the cannisters (relative to the pivotal axis) to a position directly over the centerline of the cannisters. As a result, when the rays of sun 30 strike solar panels 10 on frame members 11, 12 normal to the panel, an equal amount of sunlight (per unit area) will strike cannisters 25, 26. However, when the impinging rays of sun 30 are not normal to solar panels 10, the sun will be relative behind one or the other of shadow bars 27, 28. This results in less sunlight on the near cannister than on the far cannister, heating the far cannister and raising the vapor pressure of the volatile fluid therein to a greater degree than the near cannister. A volatile fluid 30 contained in cannisters 25, 26 and conduit 29 will adjust for the imbalance and tilt the frame so that it is again pointed directly at the sun, as discussed hereinafter.

The operation of the preferred embodiment of the present invention is illustrated by way of reference to FIGS. 2A-E. In the schematic figures, cannister 25, 26 appear to be transparent so that the volatile fluid 30 is visible therein. In FIG. 2A, the size difference between east container 25 and west container 26 is readily apparent, west container 26 having about twice the interior volume of east container 25. The supporting frame is indicated schematically as frame 32, pivoting about north/south axis 34.

Turning initially to FIG. 2A, the early morning configuration of the system is illustrated, with east container 25 essentially filled with volatile fluid 30 in its liquid form. Conduit 29 is also filled with the liquid volatile fluid, and a quantity of volatile fluid 30 is present in cannister 26, because the volume of volatile fluid in its liquid form exceeds the volume of east cannister 25 and conduit 29. The liquid volume of fluid 30 is less than the volume of west cannister 26, and more than the east cannister volume plus conduit volume. Typically, the liquid volume will be less than twice the volume of the east cannister, resulting in less liquid in west cannister 26 than east cannister 25, tilting the frame eastward. The system can operate a fluid volume of more than twice that of the east cannister, with counterweights used to tilt the frame eastward when the east cannister is filled with liquid. The volatile fluid is preferably R-12 or R-22. The remaining volume 36 of west cannister 26 not occupied by the volatile fluid in its liquid form contains a spring gas such as air, along with vapor from the volatile fluid.

Figure 2C:
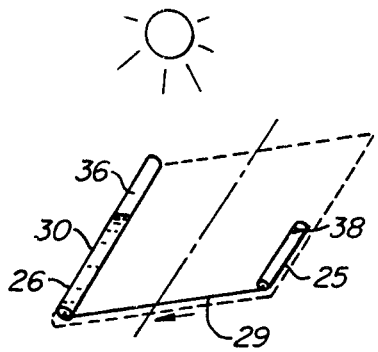
Figure 2D:
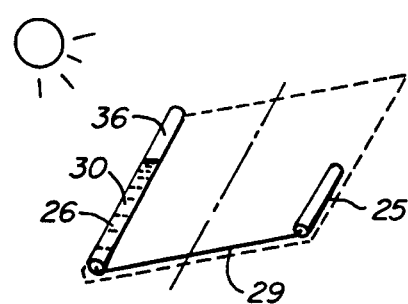
Figure 2E:
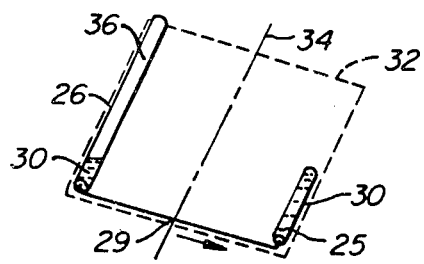

As the sun rises, west cannister 26 is initially heated because frame 32 is prevented from tilting fully to the horizon by the 55° stop. Since east cannister 25 is shielded from the early morning sun rays by shadow bar 27 (see FIG. 1) while cannister 26 is exposed, the vapor pressure in cannister 26 initially rises above that cannister 25. However, because east cannister 25 is already filled with liquid volatile fluid, no fluid transfer takes place and the frame remains tilted toward the east. This situation pertains until the sun goes past normal to the frame, after which the sun's continued westward movement will result in more solar heat input to cannister 25 than cannister 26, raising the temperature and thus the vapor pressure in cannister 25. Eventually, the vapor pressure in cannister 25 will exceed the vapor pressure (and spring gas pressure) in west cannister 26, resulting in an expansion of the gas content in east cannister 25 and the forcing of liquid volatile fluid from the east cannister to west cannister 26, as illustrated in FIG. 2D. (Movement of the liquid is also affected by static head considerations, which are ignored in the present discussion.) This transfer of liquid volatile fluid from east cannister 25 to west cannister 26 continues throughout the day so that the solar panels on frame 32 remain pointed at the sun.

In the afternoon, as frame 32 follows the sun, it will reach its westward 55° stop. As the sun continues its movement, west cannister 26 will be increasingly shaded by shadow bar 28 (see FIG. 1) while sunlight continues to fall on east cannister 25. The vapor pressure of the volatile fluid in east cannister 25 will continue to rise, forcing essentially all of the liquid into west cannister 26, as illustrated in FIG. 2C.

A small reservoir 38 is provided at the upper end of east cannister 25, so that when substantially all of the liquid portion of the volatile fluid 30 has been forced into west chamber 26, a small amount of the volatile fluid in liquid form will be trapped in reservoir 38. This small amount of liquid volatile fluid in reservoir 38 will then vaporize. Since the trapped volatile fluid vaporizes last, any foreign gas in east cannister 25 is purged from the east cannister and swept into west cannister 26, and bubbles through the liquid to the gas filled space 36 at the high end of the cannister. Foreign gasses must be periodically purged from east cannister 25, otherwise a "gas spring" will result in the east cannister, offsetting the gas spring utilized in west cannister 26.

At the end of the day, the system will have configuration of FIG. 2D, with east cannister 25 occupied solely by vaporized volatile fluid, all of the liquid being contained in west cannister 26. The spring gas, trapped foreign gasses (which act as gas springs), and a certain amount of vaporized volatile fluid, will be trapped in the space 36 at the upper end of west cannister 26.

After sunset, the vapor pressure in cannister 25 will reduce because it is no longer heated by direct sunlight, and the vapor pressures of the volatile fluid will be the same in east cannister 25 and west cannister 26. However, the space 36 at the upper end of west cannister contains not only vaporized volatile fluid, but the spring gas as well, resulting in an overpressure which will force the liquid volatile fluid 30 back through conduit 28 to east cannister 25, as illustrated in FIG. 3E. Frame 32 will thus tilt about axis 24 so that it is again pointed to the east and is ready for the morning sunrise.

Figure 3:
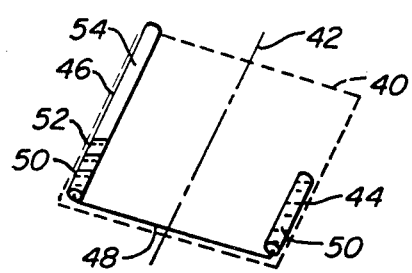
FIG. 3 is a schematic perspective illustrating an alternative embodiment of the present invention.

An alternative embodiment of the present invention is illustrated by way of reference to FIG. 3. The mechanical aspects of this embodiment are identical to those illustrated in the previous embodiment, namely, a frame 40 pivotable about a north/south axis 42, having a small east cannister 44 and a large west cannister 46 connected by conduit 48. Again, a volatile fluid 50 such as Freon is contained in an amount greater than the volume of east cannister 44 and conduit 48, but less than twice the volume of the east cannister plus the conduit. In this second embodiment, a small quantity 52 of a second liquid such as water, lighter than volatile fluid 50, is also contained in west conduit 46, and forms a layer above the volatile fluid because of its lighter weight. The upper end 54 of west cannister 26 contains both vaporized volatile fluid and water vapor, the water vapor providing a gas spring.

The second embodiment of the present invention operates similar to the first embodiment, except that gas spring fluid 52 condenses to some degree, rather than remaining in the gaseous phase as does the spring gas in the first embodiment. The use of a condensing gas provides a constant gas spring pressure, rather than the variable gas spring pressure achieved in the first embodiment with a gas which does not condense. Daytime solar tracking operates in exactly the same fashion as the first embodiment. The result at sunset is also the same, in that the pressure on the fluid from the combined gas in upper volume 54 of west cannister 46 will exceed the vapor pressure of the volatile fluid alone in east cannister 44, forcing the volatile fluid 50 back into the east cannister to tilt frame 40 to the east to be ready for the morning sunrise.

Figures 4, 5:
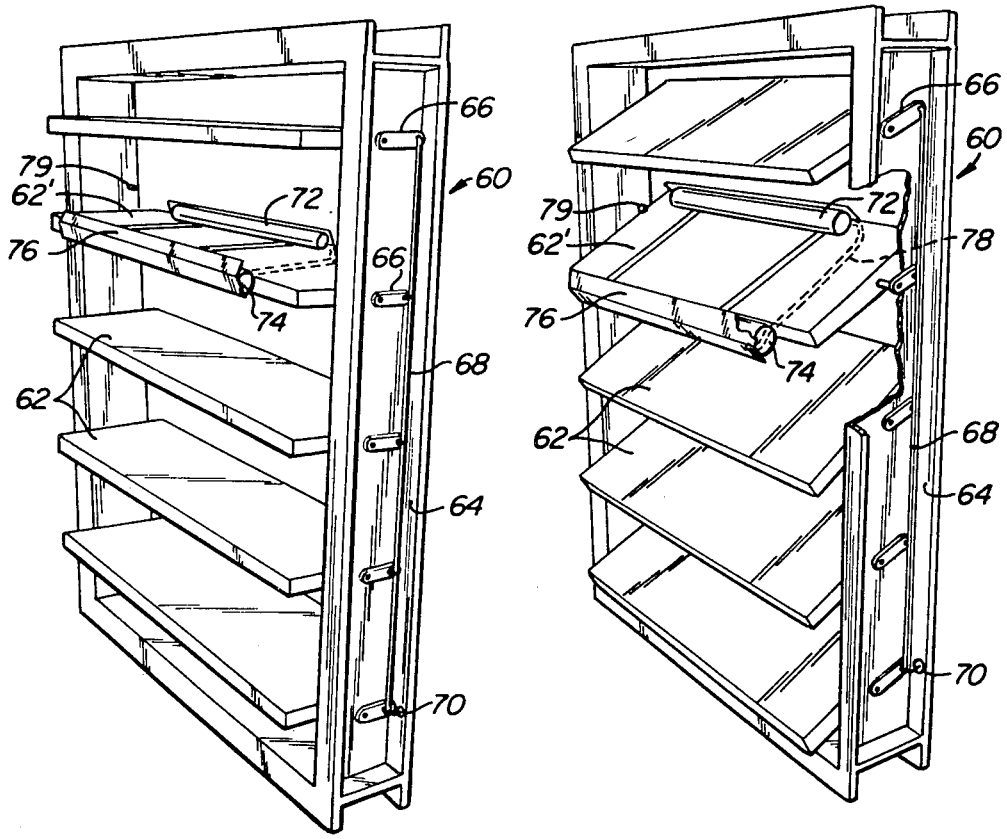
FIG. 4 is a perspective view of a horizontal louver system utilizing the present invention.
FIG. 5 is a perspective view similar to that of FIG. 4 showing the louvers in their closed position.

A louver system 60 employing the concept of the present invention is illustrated by way of reference to FIGS. 4 and 5. Louver system 60 includes a plurality of louvers 62 mounted to a vertical frame 64. Each louver 62 has a crank 66 which pivots with the Louver, and the respective cranks are interconnected by a rod 68 so that the louvers move in unison. A counterweight 70 biases cranks 66 downwardly against stop 72 in which position the louvers are parallel to each other. Louver system 60 typically will be mounted outside a window, usually a vertical window, and in the absence of sunlight the objective is to provide maximum visibility through the window by keeping the louvers horizontal.

One louver 62' has a solar tracking system mounted to it constructed according to the principles of the present invention. A small cannister 72 is mounted at the back edge of louver 62', and a large cannister 74 is mounted at the front edge. A shadow bar 76 shades large cannister 74, and in the louver system illustrated the large cannister is always nearest the sun and small cannister 72 is always furthest from the sun. A conduit 78 interconnects cannisters 72, 74 at the bottom of one end. A volatile fluid is located within cannister 72, 74 and conduit 78, having a liquid volume greater than that of the small cannister and the conduit but less than that of the large cannister.

The horizontal position of louvers 62 illustrated in FIG. 4 will block sunlight from passing through the louvers when the sun is high in the sky. Small cannister 72 will also be shaded, and the louvers will remain in their horizontal configuration. However, when the sun is low in the sky, typically early in the morning and late in the evening, sunlight will strike small cannister 72, raising the temperature of the cannister and thus its vapor pressure, forcing liquid volatile fluid into large cannister 74. The resulting shifted weight will cause the louvers to pivot, the front edge pivoting downwardly and the back edge pivoting upwardly, until small cannister 72 is again shaded from the sun, in which configuration sunlight again is blocked by the louvers. In order to purge foreign gasses from small cannister 72, a stop 79 is provided limiting the pivoting motion of louver 72.

In this configuration, small cannister 72 will become heated sufficiently to drive all of the liquid volatile fluid out of the small cannister and into large cannister 74, with the foreign gasses being purged from the small cannister as described in connection with the first and second embodiments.

A gas spring is located in large cannister 74, as described in connection with the first and second embodiments. When small cannister 72 is shaded, the gas spring will create a biasing force tending to force the liquid volatile fluid from the large cannister to the small cannister, and the biasing force, coupled with the heating of the small cannister when it is exposed to sunlight, causes the louvers to just shade the small cannister and prevent the passage of sunlight through the louvers, while maximizing visibility. Whenever sunlight is not available at all, or is shaded by the louvers even when horizontal, the louvers will be maintained in their horizontal configuration.

Figure 6:
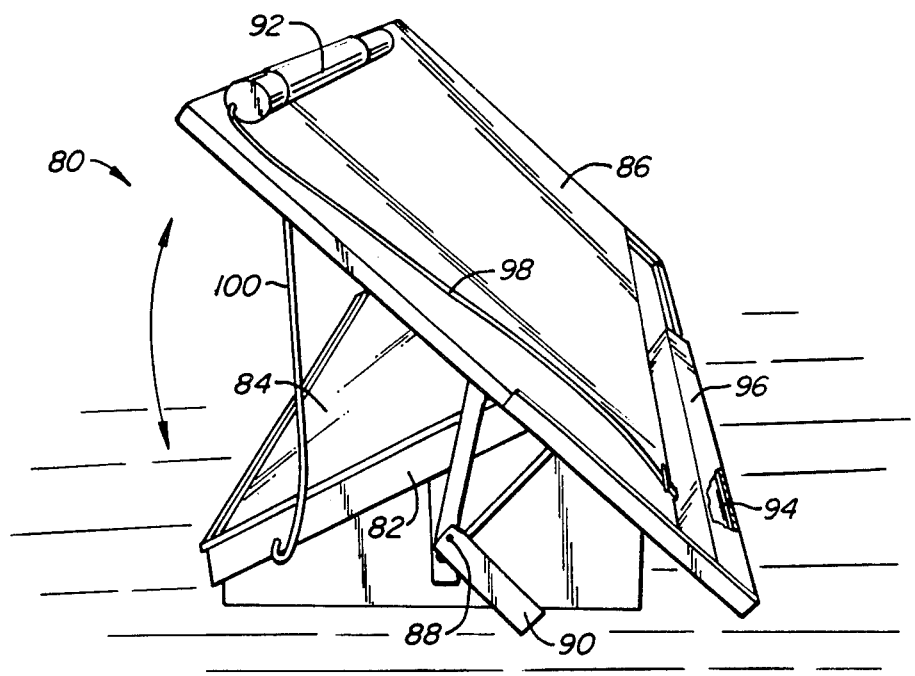
FIG. 6 is a perspective view of a batch water heater employing the present invention.

A batch water heater 80 employing the principles of the present invention is illustrated in FIG. 6. Water heater 80 employs a container 82 holding a quantity of water and having a solar collecting surface 84 directed to the sun so that the water in the container is heated by sunlight. A cover 86 has a pivotal support 88 with appropriate counterweights 90, the cover being pivotable from a closed position immediately overlying solar collecting surface 84 to the open position illustrated in which surface 84 is exposed to sunlight.

A small cannister 92 is mounted at the front edge of cover 86, and large cannister 94 is located along the back edge, underneath a shadow bar 96 which shades it from direct sunlight at all times. Cannisters 92, 94 are interconnected by a conduit 98, and contain a quantity of volatile fluid. The liquid content of the volatile fluid is greater than the volume of small cannister 92 and conduit 98, but less than the volume of large cannister 94. A gas spring fluid is located in cannister 94, in accordance with the principles described in connection with the first and second embodiments.

When sunlight is absent, the gas spring in large cannister 94 forces the volatile fluid into small cannister 92, adding weight to the front edge of cover 86 and causing it to close. When sunlight is available, cannister 92 will be heated by solar energy and the vapor pressure of the volatile fluid inside the cannister will increase, forcing the liquid volatile fluid into large cannister 94. Weight will thus be transferred from the front edge of cover 86 to its back edge, pivoting the cover open as illustrated. A flexible connector 100 limits the extent to which cover 86 can open.

While preferred embodiments of the present invention have been illustrated in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. Apparatus for tracking the sun comprising:
a pivotable frame;
large and small cannisters located at the respective ends of the frame, the large cannister having a volume $V_L$ larger than the volume $V_S$ of the small cannister;
means for shading the cannister nearer to the sun more than the cannister farther from the sun when the rays of the sun are not normal to the plane of the cannisters;

a conduit providing fluid communication between the cannisters and having a volume $V_C$;

a quantity of volatile fluid in the cannisters and conduit having a liquid volume $V_F$ defined by the limits $V_S + V_C < V_F < V_L$, so that sufficient solar heating of the small cannister relative to the large cannister forces all of the liquid volatile fluid from the small cannister to purge it of any foreign gasses; and a gas spring fluid in the large cannister having a vapor pressure sufficient to force the volatile fluid into the small cannister in the absence of sunlight so that the frame tilts toward the small cannister at nightfall and at other times when sunlight does not strike the small cannister.

2. The apparatus of claim 1 wherein the frame is pivotable about a generally north/south axis, and where the large and small cannisters are located at the west and east ends of the frame respectively so that movement of the sun from east to west during the day heats the small east cannister to raise the vapor pressure of volatile fluid in the east cannister and force the liquid content of the fluid into the east cannister and tilt the frame eastward to follow the sun, the gas spring forcing the volatile fluid back to the small cannister at nightfall in preparation for the morning sunrise.

3. The apparatus of claim 2 wherein the axis of the frame is inclined to horizontal to direct the frame toward the path of the sun.

4. The apparatus of claim 3 wherein the cannisters are elongate and positioned parallel to the inclined pivotal axis of the frame.

5. The apparatus of claim 4 wherein the conduit joins the low ends of the cannisters.

6. The apparatus of claim 1 wherein the frame comprises a drive louver biased toward a horizontal position and having a back edge and a front edge, the small cannister being located at the back edge of the drive louver and the large cannister being located at the front edge of the drive louver, so that the presence of sunlight heats the small cannister relative to the large cannister to transfer fluid to pivot the drive louver to block sunlight, and in the absence of sunlight fluid is returned to the small cannister and the drive louver returns to its horizontal position.

7. The apparatus of claim 6 and additionally comprising a plurality of driven louvers connected to the drive louver.

8. The apparatus of claim 1 wherein the frame comprises a cover having a front edge which moves from a lower closed position to a raised open position, the small cannister being located at the front edge of the cover and the large cannister being located at the opposite, rear edge; and wherein the shading means comprises means for shading the large cannister from sunlight at all times.

9. The apparatus of claim 8 and additionally comprising a batch water heater underlying the cover so that the water heater is exposed to sunlight when sunlight is available and covered when sunlight is not available.

10. The apparatus of claim 1 wherein the shading means comprises shadow bars over each cannister, each shadow bar extending from a position on the side of the cannister opposite from the pivotal axis of the frame to a position immediate over the centerline of the cannister.

11. Apparatus for tracking the sun comprising:
a base fixed relative to the earth;
a frame pivotably attached to the base so that the frame has an east end and a west end and is pivotable about a generally north/south axis, the axis being inclined to horizontal to direct the frame toward the path of the sun;
small and large elongate cannisters at the east and west ends of the frame respectively parallel to the pivotal axis of the frame so that one end of each cannister is lower than the other end of such cannister, the small cannister having a volume $V_S$ smaller than the volume $V_L$ of the large cannister;
a pair of shadow bars over the respective cannisters, each shadow bar extending from a position on the side of the cannister opposite from the pivotal axis of the frame to a position immediately over the centerline of the cannister;
a conduit providing fluid communication between the low ends of the cannisters and having a volume $V_C$;
a quantity of volatile fluid in the cannisters and conduit which is a liquid at ambient temperatures having a volume $V_F$ defined by the limits $V_S + V_C < V_F < V_L$, movement of the sun from east to west heating the small cannister to raise the vapor pressure of the volatile fluid in the small cannister and force the liquid content of the fluid into the large cannister and tilt the frame eastward to follow the sun; and
a gas spring fluid in the west cannister having a vapor pressure sufficient to force the volatile fluid to the small cannister in the absence of sunlight so that the frame tilts back toward the small cannister at night in preparation for the morning sunrise.

12. The apparatus of claim 1 or 11 wherein the frame includes a flat mounting surface for solar panels.

13. The apparatus of claim 1 or 11 wherein pivoting of the frame is limited to $\pm 55°$ from vertical.

14. A louver system for providing shade from sunlight comprising:
a plurality of louvers pivotable about parallel axes;
means for interconnecting the louvers so that said louvers pivot in unison;
a small cannister having a volume $V_S$ located along the back edge of one of the louvers;
a large cannister having a volume $V_L$ larger than $V_S$ mounted along the front edge of one of the louvers;
means for shading the large cannister from the sun;
a conduit providing fluid communication between the cannisters and having a volume $V_C$;
a quantity of volatile fluid in the cannisters and conduit having a liquid volume $V_F$ defined by the limits $V_S + V_C < V_F < V_L$, so that sufficient solar heating of the small cannister relative to the large cannister forces all of the liquid volatile fluid from the small cannister to purge it of foreign gasses; and
a gas spring fluid in the large cannister having a vapor pressure sufficient to force the volatile fluid into the small cannister.

15. The louver apparatus of claim 14 wherein the louvers are pivotable about horizontal axes, and additionally comprising means for biasing the louvers toward a horizontal position so that the louvers return to the horizontal position when sunlight does not strike the small cannister.

16. Apparatus for exposing a medium in the presence of sunlight and covering the medium in the absence of sunlight, said apparatus comprising:

a cover;

means for pivotably mounting the cover so that the cover is pivotable between a closed position overlying the medium and a open position which allows sunlight to strike the medium;

a small cannister located at the front edge of the cover and having a volume $V_S$;

a large cannister located at the rear edge of the cannister and having a volume $V_L$ larger than $V_S$;

means for shading the large cannister from sunlight;

a conduit providing fluid communication between the cannisters and having volume $V_C$;

a quantity of volatile fluid in the cannisters and conduit having a liquid volume $V_F$ defined by the limits $V_S+V_C<V_F<V_L$, so that sufficient solar heating of the small cannister relative to the large cannister forces all of the liquid volatile fluid from the small cannister to purge it of foreign gasses; and a gas spring fluid in the large cannister having a vapor pressure sufficient to force the volatile fluid into the small cannister in the absence of sunlight so that the cover closes at nightfall and at other times when sunlight is not available, the cover being balanced so that movement of the volatile fluid from the small cannister to the large cannister when sunlight is available opens the cover.

17. The apparatus of claim 16 wherein the medium comprises a batch water heater.

18. The apparatus of claim 1, 11, 14 or 16 wherein the gas spring fluid is condensible at ambient temperatures.

19. The apparatus of claim 1, 11, 14 or 16 wherein $V_F$ is slightly greater than $V_S+V_C$.

20. The apparatus of claim 1, 11, 14 or 16 wherein the small cannister includes a reservoir for trapping a relatively small volume of the volatile fluid in the small cannister, whereby the trapped volume is last to evaporate and sweeps foreign gasses from the small cannister into the large cannister.

21. The apparatus of claims 1, 11, 19 or 16 wherein the volatile fluid is selected from the group consisting of R-12 and R-22.

* * * * *